United States Patent
You et al.

(10) Patent No.: US 10,491,817 B2
(45) Date of Patent: Nov. 26, 2019

(54) APPARATUS FOR VIDEO OUTPUT AND ASSOCIATED METHODS

(71) Applicant: Nokia Technologies Oy, Espoo (FI)

(72) Inventors: Yu You, Kangasala (FI); Lixin Fan, Tampere (FI)

(73) Assignee: Nokia Technologies Oy, Espoo (FI)

( * ) Notice: Subject to any disclaimer, the term of this patent is extended or adjusted under 35 U.S.C. 154(b) by 24 days.

(21) Appl. No.: 15/193,361

(22) Filed: Jun. 27, 2016

(65) Prior Publication Data

US 2017/0026577 A1 Jan. 26, 2017

(30) Foreign Application Priority Data

Jun. 30, 2015 (EP) .................................... 15174650

(51) Int. Cl.
*H04N 5/232* (2006.01)
*G06K 9/00* (2006.01)
*G11B 27/10* (2006.01)
*G11B 27/28* (2006.01)
*G11B 27/34* (2006.01)
(Continued)

(52) U.S. Cl.
CPC ..... *H04N 5/23238* (2013.01); *G06K 9/00711* (2013.01); *G11B 27/105* (2013.01); *G11B 27/28* (2013.01); *G11B 27/34* (2013.01); *H04N 5/9201* (2013.01); *H04N 5/9305* (2013.01)

(58) Field of Classification Search
CPC .. H04N 5/23238; H04N 5/23293; H04N 5/76; H04N 5/9201; H04N 5/9305; H04N 9/8205; H04N 21/4316; H04N 21/47205; H04N 21/4882; H04N 21/816
See application file for complete search history.

(56) References Cited

U.S. PATENT DOCUMENTS 5,771,041 A 6/1998 Small
5,850,455 A 12/1998 Arnold et al.
(Continued)

OTHER PUBLICATIONS

"Head-Related Transfer Function", Wikipedia, Retrieved on Oct. 6, 2016, Webpage available at : https://en.wikipedia.org/wiki/Head-related_transfer_function.
(Continued)

*Primary Examiner* — Thai Q Tran
*Assistant Examiner* — Sunghyoun Park
(74) *Attorney, Agent, or Firm* — Harrington & Smith

(57) ABSTRACT

An apparatus comprising a processor and memory including computer program code, the memory and computer program code configured to, with the processor, enable the apparatus at least to:

use received current-field-of-view indication data together with future-event-direction data, in respect of recorded panoramic video output provided by panoramic video content data, to provide a sensory cue for a viewer of the recorded panoramic video output to indicate the direction of a future event in the recorded panoramic video output which is outside a current field of view, wherein the recorded panoramic video output is configured to provide video content to the viewer which extends outside the field of view of the viewer in at least in one direction, and the future-event-direction data is supplemental to the panoramic video content data which provides the video content itself.

20 Claims, 9 Drawing Sheets

(51) Int. Cl.
*H04N 5/92* (2006.01)
*H04N 5/93* (2006.01)

(56) References Cited

U.S. PATENT DOCUMENTS

| | | | | |
|---|---|---|---|---|
| 2004/0125133 A1* | 7/2004 | Pea | ............ | G06Q 10/10 715/751 |
| 2004/0125148 A1* | 7/2004 | Pea | ............ | H04N 5/23238 715/802 |
| 2008/0077882 A1 | 3/2008 | Kramer et al. | | |
| 2008/0317246 A1* | 12/2008 | Manders | ............ | H04N 5/783 380/37 |
| 2009/0195652 A1* | 8/2009 | Gal | ............ | B60R 1/00 348/148 |
| 2011/0149017 A1* | 6/2011 | Mory | ............ | G06T 15/00 348/36 |
| 2013/0129304 A1 | 5/2013 | Feinson | | |
| 2016/0005435 A1* | 1/2016 | Campbell | ............ | H04N 9/806 386/240 |
| 2016/0050349 A1* | 2/2016 | Vance | ............ | H04N 5/2259 348/36 |
| 2016/0063103 A1* | 3/2016 | Bostick | ............ | G06F 16/951 707/706 |
| 2016/0148417 A1* | 5/2016 | Kim | ............ | G06F 3/14 345/419 |
| 2016/0306431 A1* | 10/2016 | Stafford | ............ | G06F 3/014 |
| 2016/0381306 A1* | 12/2016 | Yang | ............ | G06T 3/40 386/280 |

OTHER PUBLICATIONS

Extended European Search Report received for corresponding European Patent Application No. 15174650.0, dated Dec. 2, 2015, 6 pages.

International Search Report and Written Opinion received for corresponding Patent Cooperation Treaty Application No. PCT/FI2016/050453, dated Aug. 9, 2016, 10 pages.

* cited by examiner

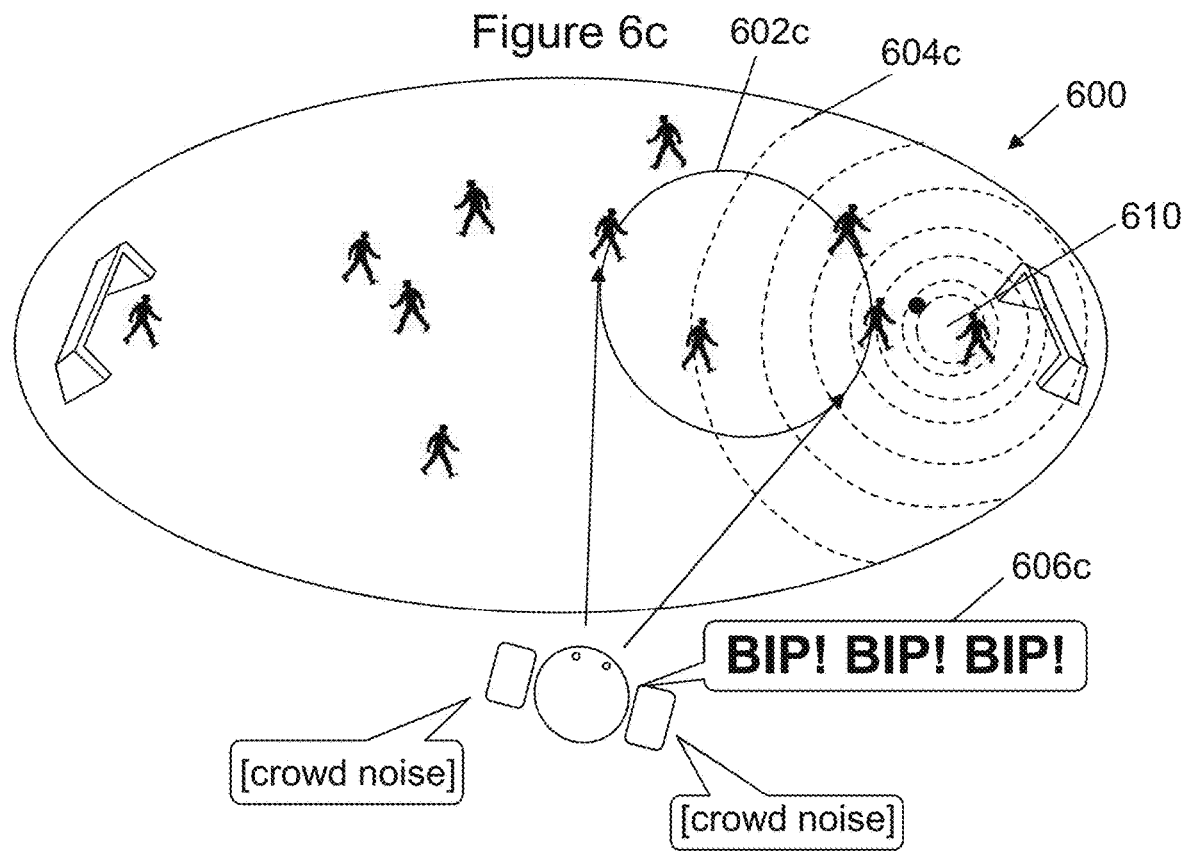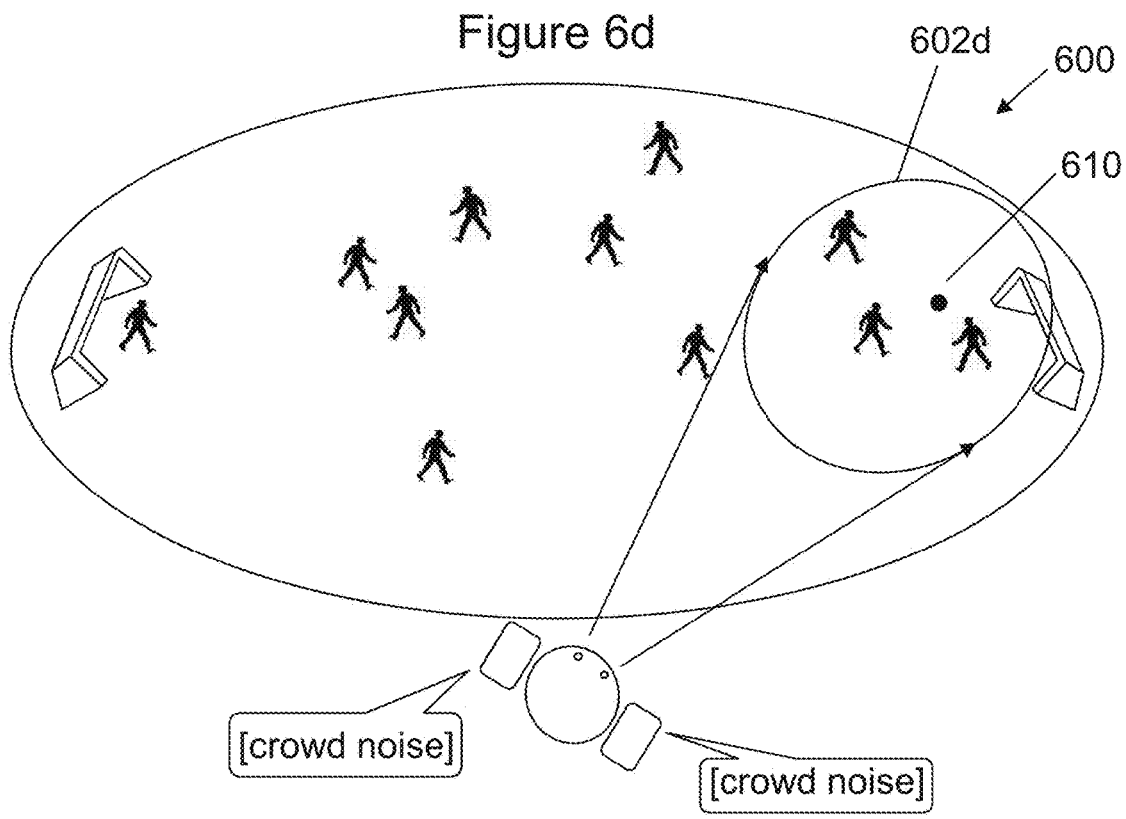

Figure 7a
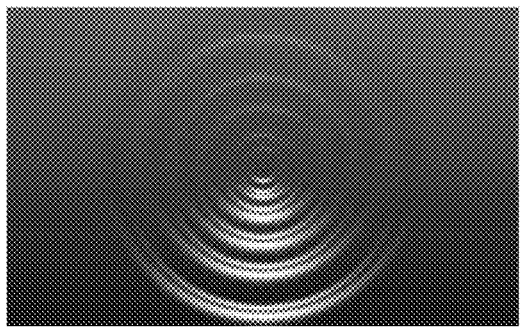 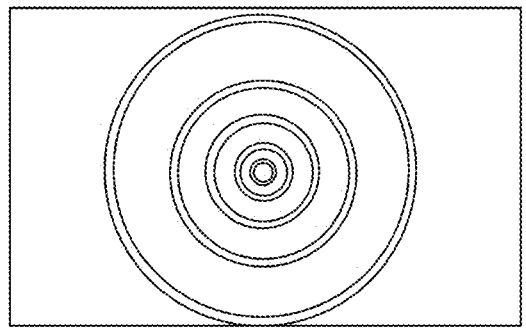
Figure 7b
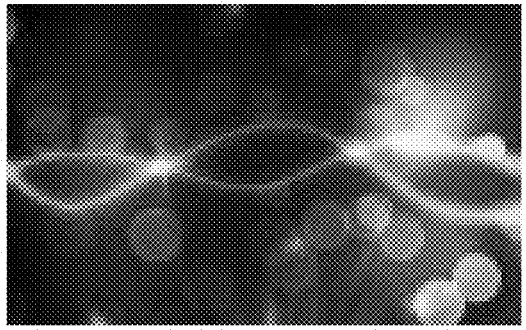 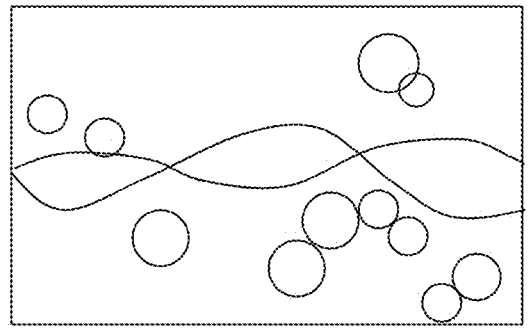
Figure 7c
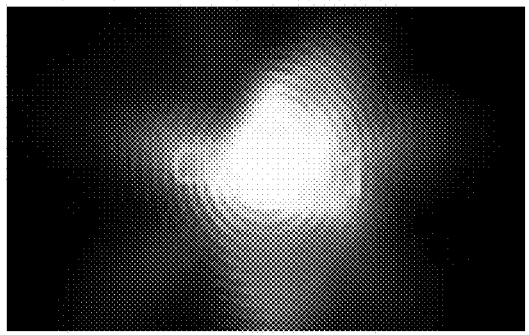 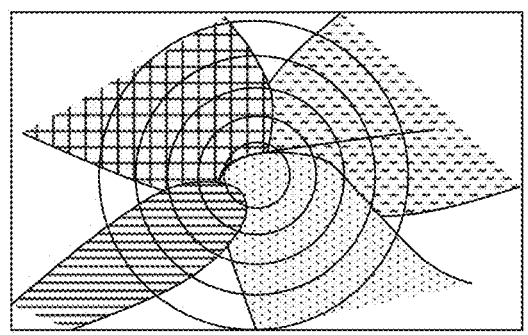

Figure 8

Using received current-field-of-view indication data together with future-event-direction data, in respect of recorded panoramic video output provided by panoramic video content data, to provide a sensory cue for a viewer of the recorded panoramic video output to indicate the direction of a future event in the recorded panoramic video output which is outside a current field of view.
800

Figure 9

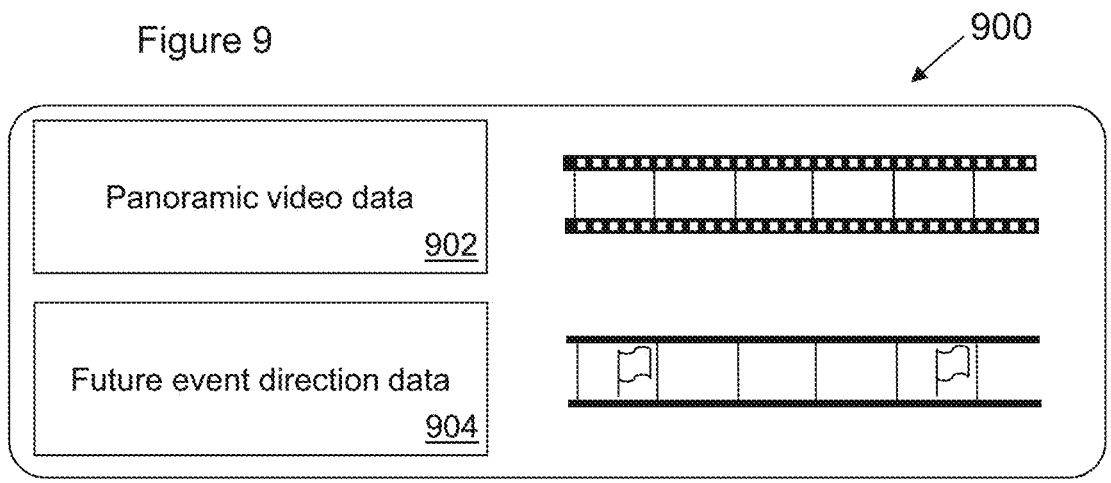

Figure 10

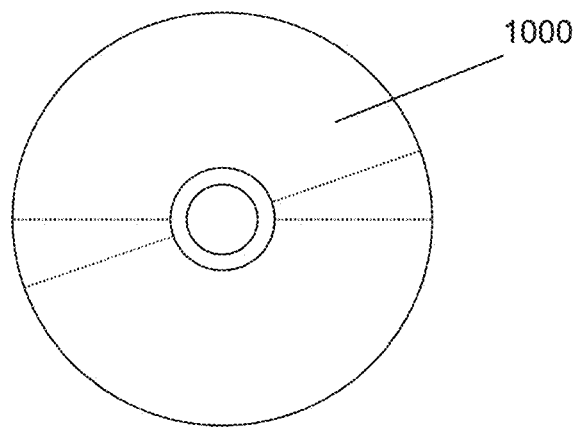

APPARATUS FOR VIDEO OUTPUT AND ASSOCIATED METHODS

TECHNICAL FIELD

The present disclosure relates to the field of video output, associated methods and apparatus, including panoramic video output.

Certain disclosed aspects/examples relate to portable electronic devices, in particular, so-called hand-portable electronic devices which may be hand-held in use (although they may be placed in a cradle in use). Such hand-portable electronic devices include mobile telephones, so-called Personal Digital Assistants (PDAs), smartphones and other smart devices, and tablet PCs. Certain disclosed examples relate to head worn devices such as smart eyewear and head mounted displays. Certain examples relate to video display apparatus and video content provision.

Portable electronic devices/apparatus according to one or more disclosed examples may provide one or more audio/text/video communication functions (e.g. tele-communication, video-communication, and/or text transmission (Short Message Service (SMS)/Multimedia Message Service (MMS)/e-mailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture functions (e.g. using a (e.g. in-built) digital camera), and gaming functions.

BACKGROUND

Panoramic videos enable a viewer to view video content in an immersive video environment.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

According to a first aspect, there is provided an apparatus comprising a processor and memory including computer program code, the memory and computer program code configured to, with the processor, enable the apparatus at least to:
  use received current-field-of-view indication data together with future-event-direction data, in respect of recorded panoramic video output provided by panoramic video content data, to provide a sensory cue for a viewer of the recorded panoramic video output to indicate the direction of a future event in the recorded panoramic video output which is outside a current field of view,
  wherein the recorded panoramic video output is configured to provide video content to the viewer which extends outside the field of view of the viewer in at least in one direction, and the future-event-direction data is supplemental to the panoramic video content data which provides the video content itself.

The sensory cue may comprise one or more of: an audio cue; a visual cue; and a haptic cue.

The sensory cue may be further configured to provide an indication of time remaining until the occurrence of the future event in the recorded panoramic video output.

The sensory cue may be configured to vary according to one or both of the spatial and temporal distance from the occurrence of the event.

The sensory cue may comprise a periodically varying cue and the period of the periodically varying cue may decrease as the time until the occurrence of the future event decreases.

The sensory cue may be configured to disappear when the future event in the recorded panoramic video output is within the current field of view.

The sensory cue may comprise a visual cue superimposed on and formed within the video content itself by one or more of: a ripple effect visual cue; a ray visual cue, and a waveform visual cue.

The sensory cue may comprise a ripple effect visual cue, and the apparatus may be configured to provide the ripple effect visual cue within the current field of view when the direction of the future event is determined to be one or more of: located substantially laterally to (i.e. one or more of to the side of, above, and below) the current field of view; and located substantially behind a viewer of the current field of view.

The current field of view may be one or more of a default field of view or a determined current field of view of the viewer.

The apparatus may be configured such that the video content within the current field of view and the video content outside the current field of view are displayed simultaneously. The apparatus may be configured such that the video content within the current field of view is displayed and the video content outside the current field of view is not displayed simultaneously.

The apparatus may be configured such that video content outside the current field of view is brought into the current field of view by panning the current field of view over a display of the recorded panoramic video output. The apparatus may be configured such that video content outside the current field of view is brought into the current field of view by scrolling the recorded panoramic video output with respect to the current field of view.

The future event may be identified by one or more event metadata tags identifying one or more properties of the future event.

The sensory cue may comprise an indication of the context of the future event in the recorded panoramic video output.

The current field of view may be determined by one or more of: camera-captured images of the viewer; gyroscope data received from a gyroscope of a head-mounted apparatus worn by the viewer; and compass data received from a compass of a head-mounted apparatus worn by the viewer.

The apparatus may be configured to provide the sensory cue based on the future event matching the viewer profile of the viewer viewing the recorded panoramic video output.

The apparatus may be one or more of: an electronic device, a portable electronic device, a head-worn display, smart eyewear, a helmet, a video projector, a video display, a desktop computer, a laptop computer, a server, a portable telecommunications device, a mobile phone, a smartphone, a tablet, a smartwatch, a personal digital assistant, and a module for one or more of the same.

According to a further aspect, there is provided a system comprising:
  a field of view apparatus configured to receive current-field-of-view indication data of a viewer;

a video apparatus configured to use recorded panoramic video output provided by panoramic video content data, to provide video content to the viewer which extends outside the field of view of the viewer of the recorded panoramic video output, in at least in one direction; and a sensory cue apparatus configured to use the received current-field-of-view indication data together with future-event-direction data, in respect of the recorded panoramic video output, to provide a sensory cue for the viewer to indicate the direction of a future event in the recorded panoramic video output which is outside the current field of view, wherein the future-event-direction data is supplemental to the panoramic video content data which provides the video content itself.

According to a further aspect, there is provided a method comprising:

using received current-field-of-view indication data together with future-event-direction data, in respect of recorded panoramic video output provided by panoramic video content data, to provide a sensory cue for a viewer of the recorded panoramic video output to indicate the direction of a future event in the recorded panoramic video output which is outside a current field of view, wherein the recorded panoramic video output is configured to provide video content to the viewer which extends outside the field of view of the viewer in at least in one direction, and the future-event-direction data is supplemental to the panoramic video content data which provides the video content itself.

The steps of any method disclosed herein do not have to be performed in the exact order disclosed, unless explicitly stated or understood by the skilled person.

According to a further aspect, there is provided a computer program comprising computer code configured to perform a method comprising:

using received current-field-of-view indication data together with future-event-direction data, in respect of recorded panoramic video output provided by panoramic video content data, to provide a sensory cue for a viewer of the recorded panoramic video output to indicate the direction of a future event in the recorded panoramic video output which is outside a current field of view, wherein the recorded panoramic video output is configured to provide video content to the viewer which extends outside the field of view of the viewer in at least in one direction, and the future-event-direction data is supplemental to the panoramic video content data which provides the video content itself.

According to a further aspect, there is provided a data structure (e.g. recorded on a non-transitory memory) comprising future-event-direction data and panoramic video content data, the panoramic video content data providing recorded panoramic video output, wherein:

the future-event-direction data together with received current-field-of-view indication data, in respect of the recorded panoramic video output, are configured to provide a sensory cue for a viewer of the recorded panoramic video output to indicate the direction of a future event in the recorded panoramic video output which is outside a current field of view of the viewer in at least one direction, and wherein the recorded panoramic video output is configured to provide video content to the viewer which extends outside the field of view of the viewer in at least in one direction, and the future-event-direction data is supplemental to the panoramic video content data which provides the video content itself.

Corresponding computer programs for implementing one or more steps of the methods disclosed herein are also within the present disclosure and are encompassed by one or more of the described examples. One or more of the computer programs may be software implementations, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

One or more of the computer programs or data structures may be provided on a computer readable medium, which may be a physical computer readable medium such as a disc or a memory device, or may be embodied as a transient signal. Such a transient signal may be a network download, including an internet download.

According to a further aspect, there is provided an apparatus comprising:

means for using received current-field-of-view indication data together with future-event-direction data, in respect of recorded panoramic video output provided by panoramic video content data, to provide a sensory cue for a viewer of the recorded panoramic video output to indicate the direction of a future event in the recorded panoramic video output which is outside a current field of view, wherein the recorded panoramic video output is configured to provide video content to the viewer which extends outside the field of view of the viewer in at least in one direction, and the future-event-direction data is supplemental to the panoramic video content data which provides the video content itself.

Throughout the present specification, descriptors relating to relative orientation and position, such as "top", "bottom", "upper", "lower", "above" and "below", as well as any adjective and adverb derivatives thereof, are used in the sense of the orientation of the apparatus as presented in the drawings. However, such descriptors are not intended to be in any way limiting to an intended use of the described examples.

The terms "user" and "viewer" are interchangeable in the following description where the skilled person would understand that a user of the apparatus discussed herein would in many cases also be a viewer of panoramic video content, and similarly that a viewer of panoramic video content would be a user of the apparatus described.

The present disclosure includes one or more corresponding aspects, examples or features in isolation or in various combinations whether or not specifically stated (including claimed) in that combination or in isolation. Corresponding means and corresponding functional units (e.g., sensory cue provider, current-field-of-view receiver, recorded panoramic video output provider, video content provider) for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:

FIGS. 6a-6d illustrate examples of sensory cues provided to indicate the direction and time until of a future event in a panoramic video;

FIGS. 7a-7c illustrate example visual effects used for sensory cues;

FIG. 8 illustrates schematically the main steps of a method described herein;

FIG. 9 illustrates schematically a data structure comprising future-event-direction data and panoramic video content data; and FIG. 10 shows a computer-readable medium comprising a computer program configured to perform, control or enable one or more methods described herein.

DESCRIPTION OF EXAMPLES

Figure 1:
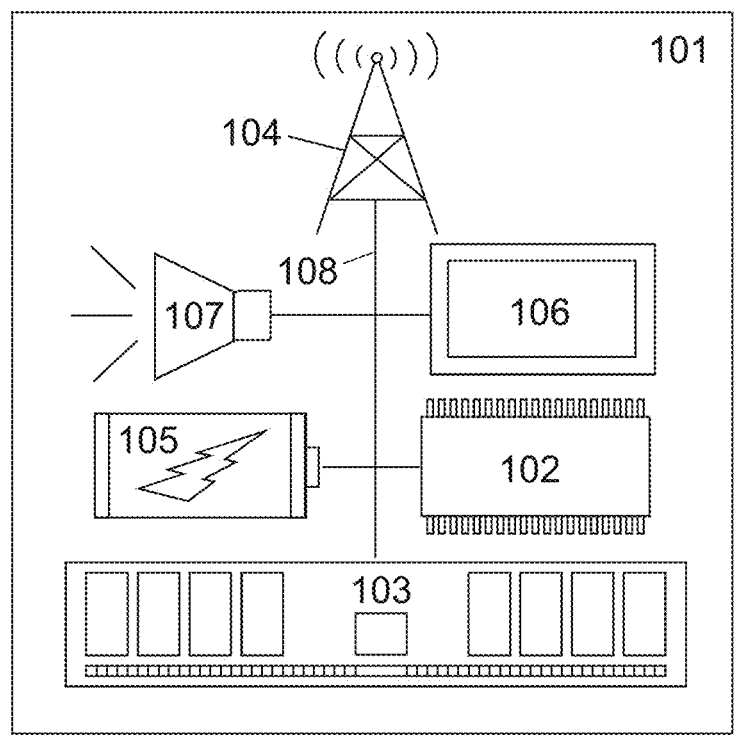
FIG. 1 illustrates schematically an example apparatus configured to perform one or more methods described herein.

The present disclosure relates to video output, including panoramic video output, and concerns an apparatus configured to provide cues to a viewer of panoramic video output. Panoramic video is gradually becoming more available, including via popular video internet sites and encompasses providing video output which would be outside a field of view of a typical viewer in at least one lateral direction. Some examples of panoramic video may support up to a 360° field of view horizontally/laterally, and up to a 360° field of view vertically as well. When playing back a 360° video, a viewer can pan their field of view around horizontally and/or vertically to watch the scene.

In some examples, a panoramic video may contain many highlights or interesting scenes that viewers may wish to pay particular attention to when they are played. Such a highlight may be called an event of interest (EOI). An EOI may, for example, be a goal scored in a football game, an explosion in an action movie, an impressive dance move by a dancer during a concert, a fun runner in a particularly unusual costume running a marathon, the first time a very famous actor appears in a movie, a shooting star in a video of the night sky, or a part of a panoramic video including the viewer or his friend/family in a home movie. It may happen that at the moment of the EOI being played, the viewer is watching a different region of the panoramic video, i.e. the viewer is looking in a direction that does not include the EOI, and hence the viewer will miss the EOI.

It may be advantageous for a viewer to be made aware of an EOI in a panoramic video, so that the viewer can watch the appropriate region of the panoramic video in which the EOI takes place and see the EOI.

Examples described here use received current-field-of-view indication data together with future-event-direction data, in respect of recorded panoramic video output provided by panoramic video content data, to provide a sensory cue for a viewer of the recorded panoramic video output. The sensory cue indicates the direction of a future event in the recorded panoramic video output which may be outside a current field of view. A viewer watching a panoramic video (e.g. a 360° video), for example in an immersive device such as a head mounted display, may benefit from such sensory cues (visual and/or non-visual) to notify him about future events in the video content which are upcoming in the video so he can change his field of view and see the recorded event. Such events can encompass the aforementioned events of interest (EOI), for example. An event of interest may be recorded in e.g. a sequence of frames of the panoramic recorded video output starting at a particular frame in the video, a particular frame in the panoramic recorded video output, a sequence of frames in the panoramic recorded video output within particular specified start and end playback times, and/or the like.

The recorded panoramic video output is configured to provide video content to the viewer which extends outside the field of view of the viewer in at least in one direction. The panoramic video may be displayed, for example, on a circular cinema screen within which the viewer is located, so he cannot see all the video output at one time (e.g. even though all the content is being displayed simultaneously within and outside the current field of view). As another example, a viewer may be watching a panoramic video using a head mounted display, wherein the user can turn his head to see different regions of the available panoramic video output (i.e. content outside the current field of view is not displayed simultaneously with content within the current field of view).

The future-event-direction data is supplemental to the panoramic video content data which provides the video content itself. The future-event-direction data may be considered to allow for the provision an event notification to a viewer in advance of an event being shown in a panoramic video. The future-event-direction data may be stored in a separate file to the panoramic video content data. In some examples the future-event-direction data may be stored in the same file as the panoramic video content data in a combined file.

The sensory cue may be thought of an a notification, a prompt, or an indicator to a viewer in advance of an event that an event (e.g. an event of interest) will be shown in the panoramic video, and the viewer can then choose to change his field of view to move towards the direction of the event (e.g. of interest) so that he doesn't miss it when it is shown in the panoramic video. An event may be a portion of the video content at a particular time which shows an "event of interest", such as, for example, a goal being scored in a football match, an explosion in an action movie, a close up of a dancer at a carnival doing an impressive dance move, a fun runner in a particularly unusual costume running a marathon, or the first time a very famous actor appears in a movie. It may be possible to better gauge that an event will be of interest by checking profile data in respect of a user. Otherwise what might be deemed of interest to one viewer/user may not necessarily be of interest to that viewer/user.

FIG. 1 shows an example apparatus 101 configured to perform one or more methods described herein. The apparatus 101 may be one or more of: an electronic device, a portable electronic device, a head-worn display, smart eyewear, a helmet, a video projector, a video display, a desktop computer, a laptop computer, a server, a portable telecommunications device, a mobile phone, a smartphone, a tablet, a smartwatch, a personal digital assistant, and a module for one or more of the same. In certain examples, the apparatus may comprise just a memory 102 and processor 103.

The apparatus may or may not be part of a video display system such as a head mounted display, or a video projector for projection of a recorded panoramic video onto a screen.

Not all elements of the apparatus need to be in the video display system, or in the same device, as, in some examples, one or more aspects (such as combining the recorded panoramic video output and the sensory cue(s) for combined output to a viewer) may be provided by one or more servers/apparatus remote from the video display system. As another example, determination of an upcoming event (e.g. of interest) lying outside a current field of view may be made by using a camera which receives current-field-of-view indication data, and the provision of the sensory cue may be made by a video projector to project a visual cue over the displayed video content.

In this example, the apparatus 101 comprises a processor 102, a memory 103, a transceiver 104, a power supply 105, an electronic display 106 and a loudspeaker 107, which are electrically connected to one another by a data bus 108. The processor 102 is configured for general operation of the apparatus 101 by providing signalling to, and receiving signalling from, the other components to manage their operation. The memory 103 is configured to store computer program code configured to perform, control or enable operation of the apparatus 101. The memory 103 may also be configured to store settings for the other components. The processor 102 may access the memory 103 to retrieve the component settings in order to manage the operation of the other components. The processor 102 may be a microprocessor, including an Application Specific Integrated Circuit (ASIC). The memory 103 may be a temporary storage medium such as a volatile random access memory. On the other hand, the memory 103 may be a permanent storage medium such as a hard disk drive, a flash memory, or a non-volatile random access memory.

The transceiver 104 is configured to transmit data to, and/or receive data from, other apparatus/devices, whilst the power supply 105 is configured to provide the other components with electrical power to enable their functionality. The electronic display 106 may be an LED, LCD or plasma display, and is configured to display visual content, such as the recorded panoramic video output, which may be stored (e.g. on the storage medium) or received by (e.g. via the transceiver) the apparatus 101. Similarly, the loudspeaker 107 is configured to output audio content which is stored on or received by the apparatus 101. Such output may be a soundtrack to accompany displayed recorded panoramic video output and/or an audio sensory cue. The visual and audio content may comprise related components of a combined audio visual content. In other examples, the display 106, loudspeaker 107 and any user interface components may be remote to, but in communication with, the apparatus 101 rather than forming part of the apparatus 101. Further, in other examples, the power supply 105 may be housed separately from the apparatus 101, and may be mains power.

Figure 2:
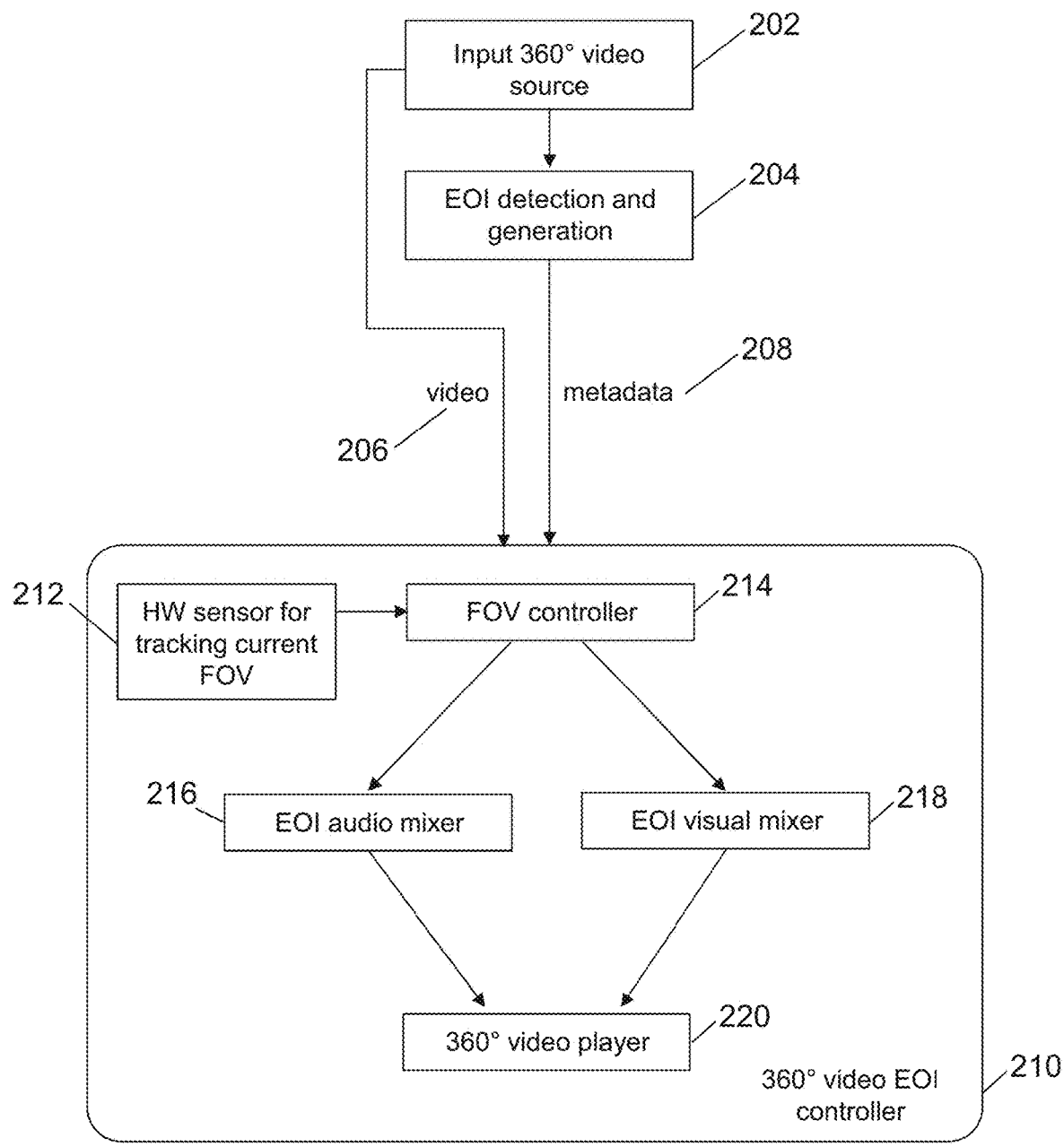
FIG. 2 illustrates schematically an example system configured to perform one or more methods described herein.

FIG. 2 illustrates schematically an example system 200 according to one example. This example is for 360° surrounding panoramic video and the term event of interest (EOI) is used although it will be appreciated that the present disclosure applies to future events per se in panoramic video content. The panoramic video system 200 takes panoramic video content data as a video source 202. The event of interest (EOI) detection and generation module 204 analyses the panoramic content data 202 and generates metadata about detected EOIs in the panoramic video content data. Metadata is discussed further in relation to FIG. 3. In other examples, identification of future event data may be a manual process where content is manually viewed and appropriate metadata tags included, for example in a metadata file. In some examples, the apparatus may be configured to identify events within the video data "on the fly". In such an example, the panoramic video content data may be buffered before playback (after a buffer delay). In this way, events may be identified within the video content data, and those events may be indicated to a viewer by a sensory cue prior to the event being displayed in the buffer-delayed video playback.

The output metadata 208 can be stored separately and transferred for further processing along with the video content 206 (as shown in FIG. 2) for provision to a viewer. In other examples, the metadata 208 may be encoded back with the input panoramic video content data 202 and the new panoramic video content data including metadata (not shown) may be further processed for provision to a viewer.

The output metadata 208 and the video content 206 in this example are used as inputs to an EOI controller 210. Such an EOI controller 210 may in some examples be an add-on component to an existing panoramic video player. The EOI controller 210 in this example comprises a field of view controller 214, an EOI audio mixer 216 and an EOI visual mixer 218. The field of view controller 214 is configured to track the current field of view of a viewer, for example using data received from a hardware sensor for tracking the current field of view of a viewer 212. The mixers 216, 218 in this example map the input EOI metadata 208 to the input panoramic video content data 206 and render the audio and visual sensory cues synchronously with the appropriate video frames of the panoramic video content data. This may take place in the rendering pipeline of the video player 220, for example. The recorded panoramic video output may then be provided to a viewer along with the sensory cues via a panoramic video player 220.

The sensory cues alert the viewer to an EOI in the panoramic video content in advance of the event being shown.

The system in FIG. 2 may be considered to comprise an apparatus configured to use received current-field-of-view indication data (from the field of view controller 214) together with future-event-direction data (from the metadata 208), in respect of recorded panoramic video output 206 provided by panoramic video content data (the input video source 202), to provide a sensory cue (an audio cue from the audio mixer 216 and/or a visual cue from the visual mixer 218) for a viewer of the recorded panoramic video output 206 to indicate the direction of a future event in the recorded panoramic video output 206 which is outside a current field of view. The recorded panoramic video output 206 is configured to provide video content to the viewer which extends outside the field of view of the viewer in at least in one direction, and the future-event-direction data 208 is supplemental to the panoramic video content data 202 which provides the video content itself.

In some examples a sensory cue may be provided to also indicate the direction of a future event in the recorded panoramic video output 206 which is within a current field of view. For example, if a first future event is due to happen in 20 seconds time within the current field of view and a second future event is due to happen in 25 seconds time outside the current field of view, two sensory cues may be provided to the user, one relating to each future event. The sensory cue relating to the event due to occur within the user's current field of view in 20 seconds may be provided to notify the user so the user can decide not to change his field of view to look away at the event currently outside his field of view, instead maintaining his current field of view to see the upcoming event due to appear in that current field of view.

In some examples, if two events are due to occur within a predetermined "short" period of time (e.g. five seconds), then the apparatus may be configured to provide a sensory cue for the second event (i.e. the event further away in time) only after the first event (i.e. the event closer in time to the current time) has commenced (or completed). In other examples a sensory cue for the second event may be provided after a delay period to provide the user with a sense of separation in time of the events, and to reduce viewer confusion as to which way to change his field of view to see the events, while still providing sensory cues for both events in sufficient time (e.g., five seconds before an event commencing) for the viewer to view both events.

In some examples the apparatus may allow for a user to specify user preference settings for how the sensory cues are provided and in which cases they are to be provided (of course, administrator or other settings may be specified, for example from an update received from a remote server). For example, in a recorded panoramic video of a basketball game, a "blue team" event and a "red team" event may both be due to occur outside the current field of view, and may each be indicated to a user with respective associated sensory cues. A user may specify that he is more interested in events relating to the blue team rather than the red team in a user preference setting. A sensory cue relating to a "blue team" event may thus be made more prominent than a "red team" sensory cue based on these user preferences (e.g., the "blue team" cue may be louder, brighter, or indicated using a both an audio and visual cue whereas the "red team" event may be indicated with an audio but not a visual cue, for example). Of course, only events related to the (blue) team of interest may be provided, rather than that for the (red) team of non-interest.

Other possible user preference settings may be available so that a user can configure the apparatus according to his preferences. For example, a user may specify that sensory cues are only to be provided for events outside the current field of view and not within the current field of view as well. As another example the user may be able to set a maximum time, before which a sensory cue is not provided to indicate an event outside the current field of view (for example, to prevent the user being distracted for an unnecessarily long time by a sensory cue). For example, he may specify that only events due to occur within 20 seconds of the current time should be indicated with an associated sensory cue. As a further example, a user may be able to specify that events requiring a "small" change of the current field of view (for example, a change in head position of up to 30° rotation) should be notified to him only with a visual sensory cue, whereas events requiring a "large" change of head position (for example, greater than 30° head rotation) should be notified to him with both audio and visual sensory cues.

Figure 3:
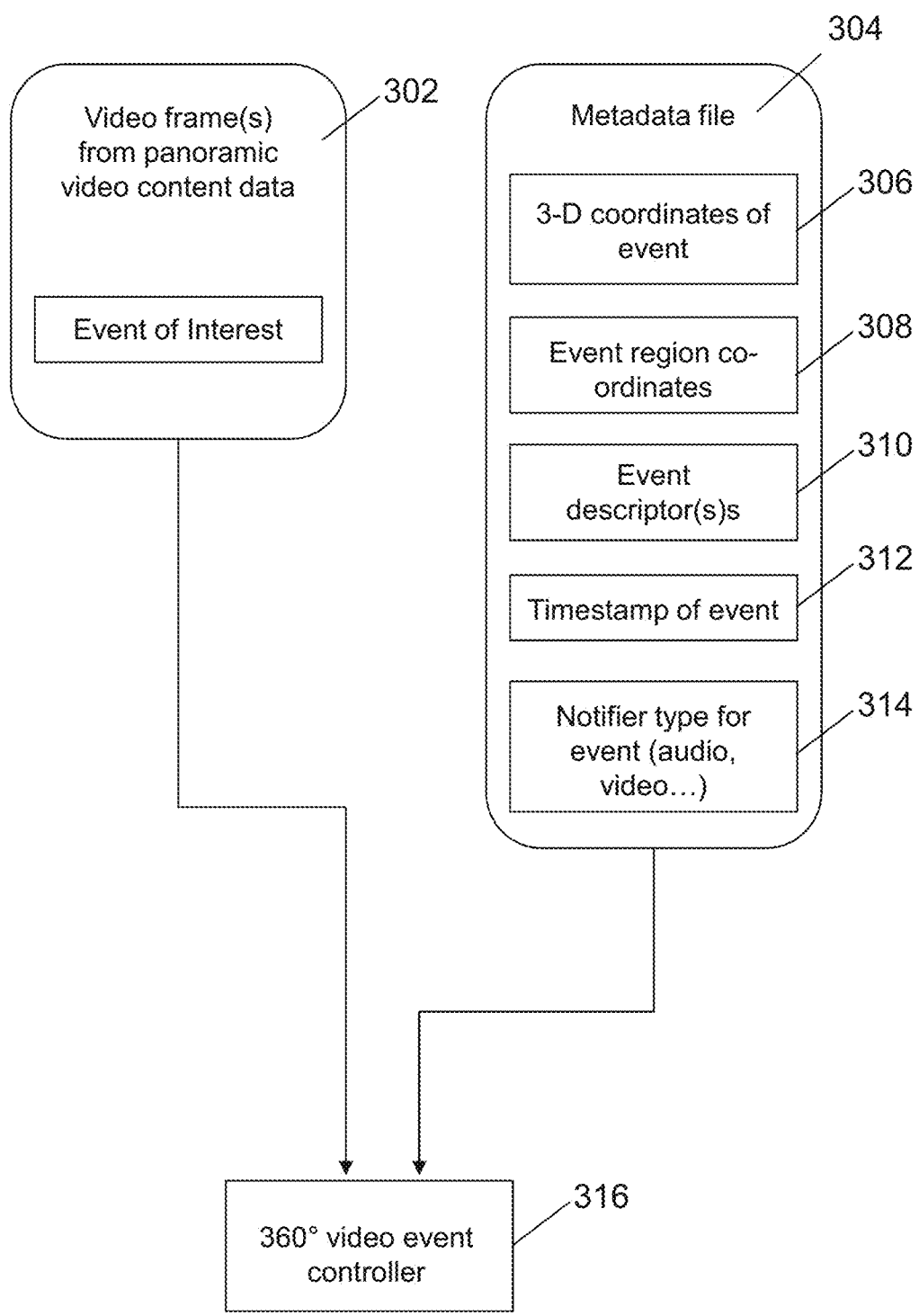
FIG. 3 illustrates schematically an example of metadata used to tag an event of interest.

FIG. 3 illustrates schematically an example of panoramic video content data 302 in which an event of interest has been identified, and an accompanying metadata file 304 associated with the identified event of interest, according to one example. One or more video frames may be associated with an event of interest.

Examples of metadata 304 which may be included are: a 3-D spatial location 306 given as (x, y, z) coordinates, for example; an event of interest boundary or region 308, an event descriptor 310 (for example, "close-up", "action", "goal/points scored", "rare event"); a timestamp 312 defining at what temporal point(s) in the panoramic film content the event takes place; and a sensory cue type 314 (for example, provide an audio/visual/haptic cue, provide a particular type of audio/visual/haptic cue) and/or the like. Other metadata fields may be included. In some examples, the metadata 304 may be combined with the panoramic video content data 302 in a combined video data-plus-metadata file.

In some examples, a group of two or more video frames 302 may have an associated metadata file 304 for an event of interest recorded in those video frames. For example, an event of interest may be labelled as taking place in a particular region of display of the panoramic video, and that region is logged in the metadata file 304 along with an identifier of the first and last video frames in a series which include the event of interest. An example is of an inset region showing a close up of a singer's face during a concert, while the remainder of the panoramic video shows the whole stage. The coordinates and frame numbers of the inset region may be listed in the metadata 304.

In other examples, each video frame in a group of one or more video frames 302 may have a separate metadata file 304, and those metadata files 304 may be associated with each other as relating to the same event of interest. For example, each video frame 302 may have an individual metadata file 304 listing the (x, y, z) coordinates of the event of interest in that frame. As an example, an event of interest may be a bird flying, and the location of this event (the bird) changes over time. Each video frame 302 containing the bird may have an associated metadata file 304 containing the (x, y, z) coordinates of the bird for that particular video frame.

The metadata 304 and panoramic video content data 302 are then provided to a processing unit such as video player 316 for playback to a viewer.

Figure 4:
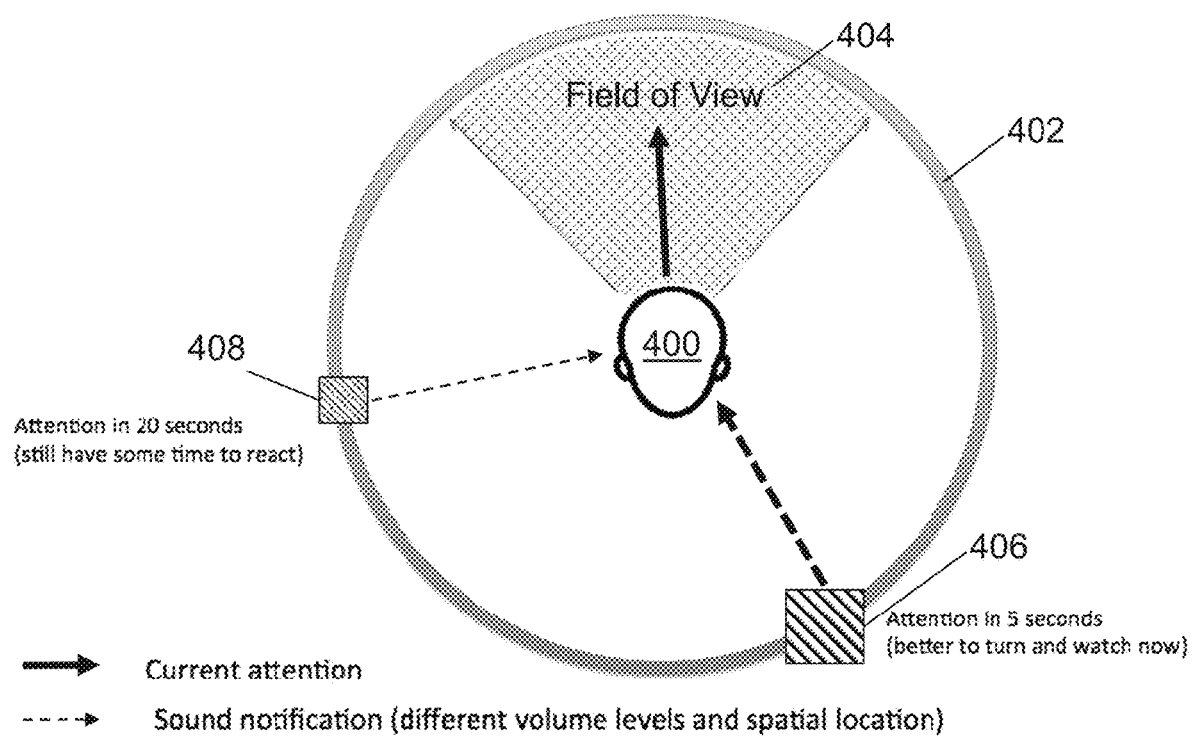
FIG. 4 illustrates an example of sensory cues provided to a panoramic video viewer.

FIG. 4 illustrates an example of sensory cues provided to a panoramic video viewer. In this example, a viewer 400 is watching a portion of a panoramic video 402 which is within his field of view 404. The viewer's current attention is focussed within his current field of view 404. Two events of interest are due to occur in the panoramic video 402 which are outside the viewer's current field of view 404. The first event of interest 406 is due to occur in five seconds from the current time, and the second event of interest 408 is due to occur in 20 seconds from the current time. The events 406, 408 may be considered to have associated "ahead-of-time" timestamps.

In this example each event of interest 406, 408 has an associated audio cue as a sensory cue which is provided to the viewer 400 so he is made aware of events in the panoramic video 402 which he will miss based on his current field of view 404 which excludes the locations of the events 406, 408. In other examples a visual cue and/or a haptic cue may be provided to the viewer.

The first event 406 is due to occur in five seconds. The viewer 400 is provided with a loud audio signal (loud to signify that the event is imminent and he should change his field of view now in order to see it).

The audio signal is directed at his right side, because he should turn to his right to see the event 406. The second event 408 is due to occur in twenty seconds. The viewer 400 is provided with a quieter audio signal than the first signal 406 (quieter to signify that the event is less imminent than the first event 406, and that the viewer has some time before he should change his field of view in order to see it). The audio signal is directed at his left side, because he should turn to his left to see the event 408. The directionality of the audio cues inform the viewer of the direction of the event relative to his current field of view. The directionality of the sound may be provided by considering a head related transfer function, for example. A head-related transfer function is a response that characterises how an ear receives an audio signal from a point in space.

In this example, the audio sensory cues are configured to provide an indication of time remaining until the occurrence of the future event 406, 408 in the recorded panoramic video output by having different volumes, wherein a louder volume signifies an event is closer in time. The audio cues are configured to vary according to the temporal distance from the occurrence of the respective events 406, 408, since the cues are quieter if the events are further away in time, and are louder if they are closer in time to the current moment. For example, the sound volume levels, the sound pitch, and/or the frequency of sound variation (in volume and/or pitch) may indicate the temporal proximity of the event to the viewer. In this way the viewer is provided with audio cues which let him know that, to see both events, he should turn to the louder audio cue first to see the first event, followed by the quieter audio cue to see the second event. In some examples, the volume may gradually increase until an event occurs, or until the viewer's field of view includes (e.g., at least part of) the event location, at which point the audio cue will stop.

In other examples, if there are multiple sensory cues being provided at the same time, each sensory cue may have a difference (other than volume) so that the viewer 400 can distinguish the two cues. The sound used as the audio cue may be different depending on the type of event. For example, short duration events may have an associated rapidly varying audio cue, whereas longer duration events may have an associated slowly varying audio cue. As another example, a user may be able to enter a preference for event types to a user profile, and preferred types of event may have a first associated audio cue, whereas less preferred event types may have a different second associated audio cue. Of course many other ways of distinguishing between two audio cues (and other types of sensory cues) for two different events are possible. In some examples, a system, apparatus, application or another user may define the preferences for a user.

In some examples, the content of the future event may be conveyed to the viewer via the audio cue. For example, the audio cue may comprise synthesized speech generated from a text-to-speech engine. The text may be recorded in metadata associated with the future event. The audio cue may therefore inform the viewer of the nature of the event by reciting a keyword relating to the event as the audio cue. In this way a viewer can choose to change his field of view to see the event, or ignore the event, because he will have an idea of what the event will be from the speech provided in the audio cue (for example, "goal" to indicate a goal is about to be scored, "close-up" to indicate a close up show is about to be shown, or "action" to indicate some action is about to take place, such as a fight, explosion or crash in an action movie). As another example the type of sound may indicate the context of the event. For example if the panoramic video is showing a sports event, then a goal or point scored may be indicated using a "positive-sounding" audio cue such as a cheer or clapping sound, whereas a fall or foul may be indicated using a "negative-sounding" audio cue such as booing or hissing.

To provide the audio sensory cue, an audio mixer may receive the event metadata as input and generate a directional sound cue as an output associated with the event. In some examples, a viewer may be able to interact with a user interface to manually tune the properties of the audio cues, such as changing the volume, type of sound, pitch, etc.

In other examples, the viewer may be provided with a visual sensory cue to indicate the direction of a future event in a recorded panoramic video output which is outside a current field of view. For example, the direction from which a visual cue originates may indicate the direction of the future event with respect to the current field of view. Other properties of the event may be conveyed via properties of the associated sensory cues, as discussed below.

Figure 5A:
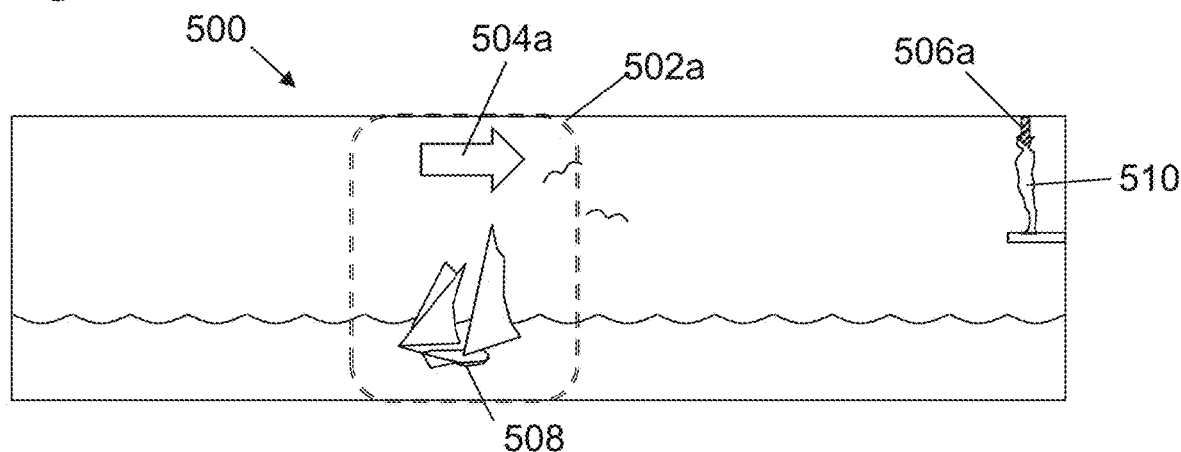
FIGS. 5a-5c illustrate examples of sensory cues provided to indicate the direction of a future event in a panoramic video.
Figure 5B:
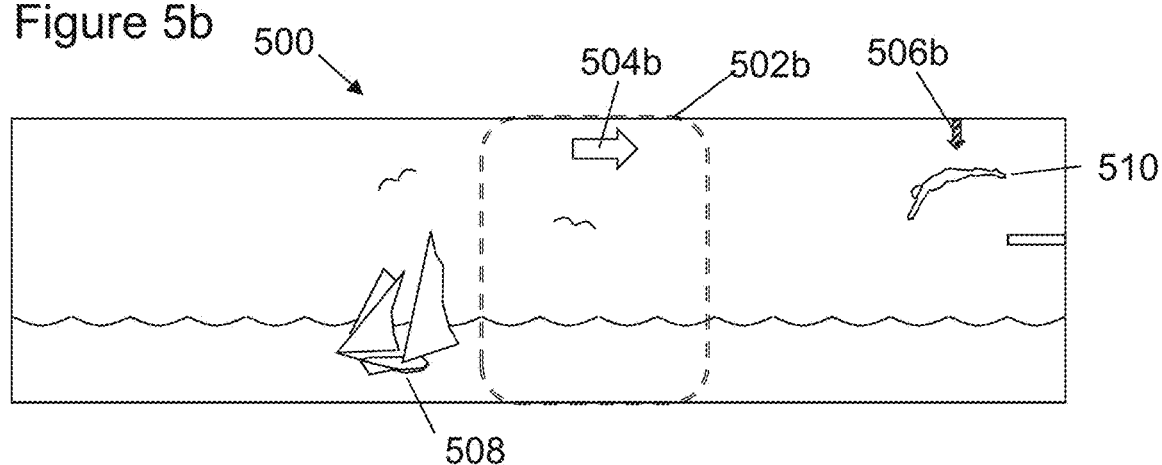
Figure 5C:
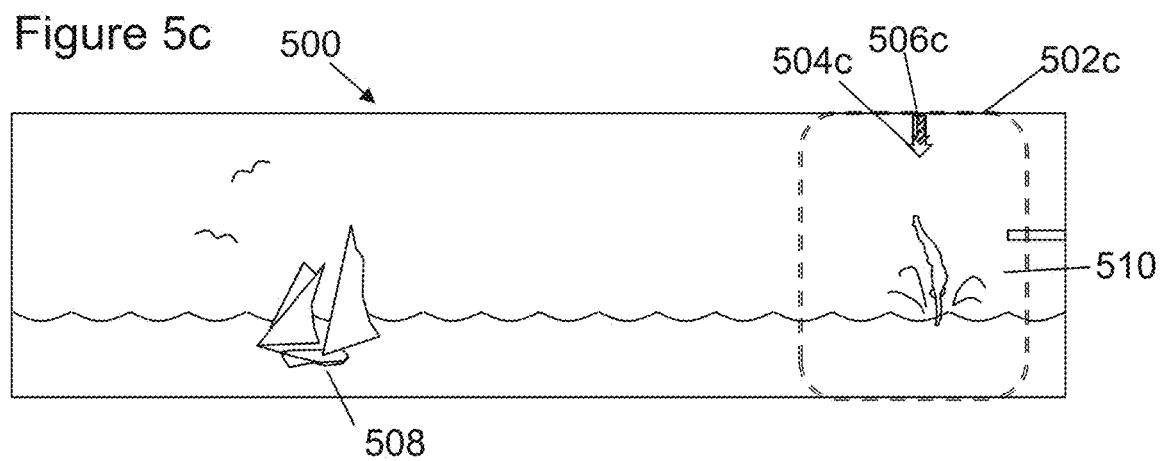

FIGS. 5a-5c illustrate examples of sensory cues provided to indicate the direction of a future event in a panoramic video. The recorded panoramic video output 500 is configured to provide video content to the viewer which extends outside the field of view 502a, 502b, 502c of the viewer in at least in one direction. In this example the viewer can pan left and right horizontally to view different regions of the panoramic video content 500, which is displaying a water scene. Video content outside the current field of view 502a, 502b, 502c is brought into the current field of view 502a, 502b, 502c in this example by panning the current field of view 502a, 502b, 502c over the displayed recorded panoramic video output 500 (for example, by the viewer turning his head).

In this example a visual cue 504a is provided to a viewer to indicate that an event (a diver diving) is going to occur in the video in the future, so the viewer can choose to change his field of view and watch the event when it takes place.

Current-field-of-view indication data is received at an apparatus to indicate the viewer's current field of view 502a, 502b, 502c. Also received by the apparatus is future-event-direction data (for example, from a metadata file for the panoramic video content data which provides the recorded panoramic video output 500). Together these data are used by the apparatus to provide a sensory visual cue 504a, 504b, 504c for a viewer of the recorded panoramic video output 500 to indicate the direction of a future event 510 in the recorded panoramic video output 500 which is outside the current field of view 502a, 502b. The future-event-direction data is supplemental to the panoramic video content data which provides the video content 500 itself.

In FIG. 5a, the viewer's current field of view 502a is focussed on a sailing boat 508 in the video scene 500. In the near future in the video 500, a diver 510 is about to dive into the water, but the viewer's current field of view 502a does not include the diver's location so the viewer will not see the dive unless he changes his field of view 502a.

To indicate to the viewer that an event is about to occur, a sensory cue (in this example a visual cue) 504a is provided within the current field of view to show the viewer than an event is about to occur. In this example the visual cue 504a is an arrow pointing in the direction of the future event. In this example the size of the arrow 504a, 504b, 504c indicates how far away in space the event is from the viewer's current field of view (that is, it represents how far the viewer will need to move his field of view by in order to see the event). The viewer has seen the visual cue 504a and wishes to see the event.

In FIG. 5b, the viewer changes his current field of view 502b to move his field of view in the direction of the event. Because the viewer's field of view 502b is closer to the event 510 than in FIG. 5a, the visual cue 504b is smaller than the previous cue 502a. In other words, in this example the sensory (visual) cue 504a, 504b is configured to vary according to the spatial distance from the occurrence of the event 510, in that as the viewer's field of view 502b moves closer to the event 510, the visual arrow cue 504b becomes smaller. The visual cue also changes according to the spatial distance from the event in this example by moving position and appears to slide along the top of the panoramic video output as the viewer's field of view moves towards the event. Also, in this example, the position of the event changes with time (as the diver moves to the left when performing his dive), and so the marker indicating the position of the event 506a, 506b, 506c also moves with the moving event. In other examples a marker indicating the position of an event may not move and may be centred, for example, on a location corresponding to the start position of the event.

In FIG. 5c, the viewer's current field of view 502c includes the location of the event 510. Because the viewer's field of view 502 includes the event 510, the visual cue 504c has changed to be a small arrow pointing down toward the event 510 (thereby providing a sensory cue for an event within the viewer's current field of view). In other examples, the visual cue 504c may disappear when the direction of the future event 510 in the recorded panoramic video output 50 is within the current field of view 502c, because the viewer no longer needs to be alerted to an event occurring since he will see the event with his current field of view.

In this example, video content within the current field of view and the video content outside the current field of view are displayed simultaneously. This may be the case if, for example, the panoramic video output is displayed on an ultra-wide screen and the whole panoramic content can be displayed simultaneously.

In other examples, the video content within the current field of view may be displayed and the video content outside the current field of view may not displayed simultaneously. This may be the case when a user of a headset is viewing panoramic content so only panoramic content in the field of view is displayed. This may also be the case, for example, if a viewer is viewing 360° panoramic video output, and the video output which would be displayed behind the viewer is not shown, for example to save energy. As the viewer moves his field of view the region of the display screen showing video output may change to track the viewer's field of view direction. A sensory cue may still be provided in respect of an event which is outside the viewer's current field of view in a portion of the panoramic recorded video output not being displayed (because it is outside the viewer's current field of view). For example, if a ripple visual effect is provided as a sensory cue, then the position of the event of interest may be calculated and visual ripples may appear within the current field of view as if they have originated from the location of the event of interest, even if the portion of the video output outside the current field of view in which the event of interest is due to be shown is not currently being displayed.

In some examples, it may be that the video content within a viewer's current field of view is displayed as well as video content being displayed in a boundary region outside the viewer's current field of view, which may be perceived in the viewer's peripheral vision. Such a display scheme may minimise an unnatural effect of an abrupt cut-off of panoramic video content outside the immediate field of view.

As another example, a viewer may be watching a panoramic video on a display screen such as a computer monitor, on which a portion of the available video output is displayed at any one time on the display screen while other portions may be viewed by a viewer scrolling around (e.g. using a trackball, mouse or arrow keys) to see other regions of the available video output on the display screen. That is, video content outside the current field of view (the monitor screen) may be brought into the current field of view by scrolling the recorded panoramic video output with respect to the current field of view.

In some examples, the current field of view may be a determined current field of view of the viewer. The current gaze direction, and therefore field of view, of a viewer may be determined for example by a camera used to captured images of the viewer and determine his gaze direction from the captured images; by a camera used to capture a view from the point of view of the viewer; by a camera on a head-worn viewing unit used to capture image(s); or from gyroscope and/or compass data from a head-worn viewing unit, such as a head mounted display or smart eyewear, wherein the gyroscope and/or compass determine the user's current gaze direction from measuring his head orientation.

In other examples, the current field of view may be a default field of view. For example, in a panoramic cinema which extends around a viewer by 180°, a default field of view may be taken as the centre portion of the screen (for example, between 150° and 210° around the screen arc). This may be set as a default position because a user may be expected to predominantly watch the centre portion of the screen. As another example, the default field of view may be taken as a portion of a panoramic display screen which is showing the most interesting part of a video. The "most interesting" part may be, for example, the portion of a display screen which has the highest number of events of interest designated as being located in that portion of the screen at a particular time, or may be the portion of a display screen which has been designated as a region of interest for a particular video content (for example, if the video content is a racetrack, the region of the screen displaying the finish line may be included in a default field of view).

FIGS. 6a-6d illustrate examples of sensory cues provided to indicate the direction of, and time until, a future event in a panoramic video. In this example the viewer can pan horizontally and vertically to view different regions of the panoramic video content 600, which is displaying a football match. Video content outside the current field of view 602a, 602b, 602c, 602d is brought into the current field of view 602a, 602b, 602c, 602d in this example by the viewer 650 moving his head to pan the current field of view 602a, 602b, 602c, 602d over a display of the recorded panoramic video output 600. The viewer 650 is wearing headphones 652 to listen to the audio output from the recorded panoramic video output. No sensory cues are displayed in FIG. 6a (for example, a user may have a user interface option to receive or hide available sensory cues, and in FIG. 6a the cues are hidden, while in FIGS. 6b-6d the cues are provided).

In this example a visual cue and an audio cue are provided to the viewer 650 to indicate that an event (a goal being scored) is going to occur in the video in the future. The viewer may, prompted and guided by the sensory cue, choose to change his field of view and watch the event when it takes place. The recorded panoramic video output 600 is configured to provide video content to the viewer which extends outside the field of view 602a, 602b, 602c, 602d of the viewer 650 in at least in one direction (in this example, to the right and slightly down from his current field of view).

Current-field-of-view indication data is received at an apparatus to indicate the viewer's current field of view 602a, 602b, 602c, 602d. Also received by the apparatus is future-event-direction data (for example, from a metadata file for the panoramic video content data which provides the recorded panoramic video output 600). Together these data are used by the apparatus to provide a sensory cue 604b, 604c, 606b, 606c for a viewer of the recorded panoramic video output 600 to indicate the direction of a future event 610 in the recorded panoramic video output 600 which is outside the current field of view 602a, 602b, 602c. The future-event-direction data is supplemental to the panoramic video content data which provides the video content 600 itself.

Figure 6A:
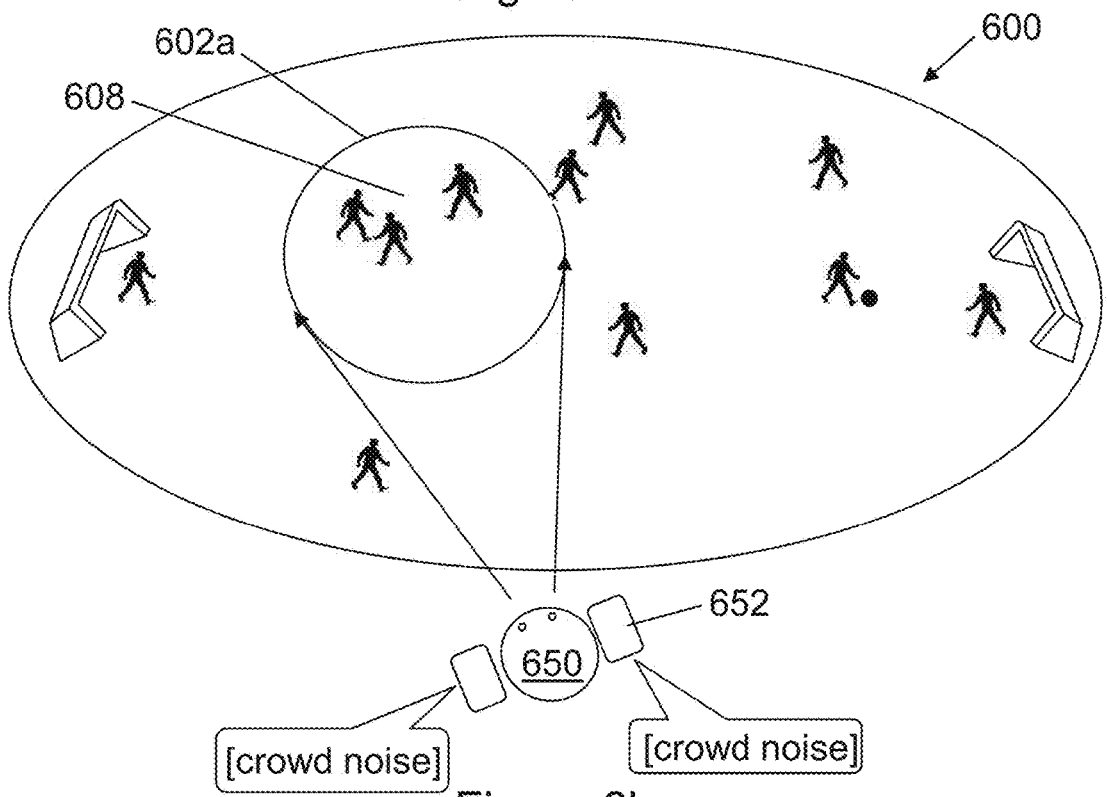

In FIG. 6a, the viewer's current field of view 602a is focussed on a group of players 608 talking. No sensory cues are provided regarding an event out of the current field of view 602a in FIG. 6a.

Figure 6B:
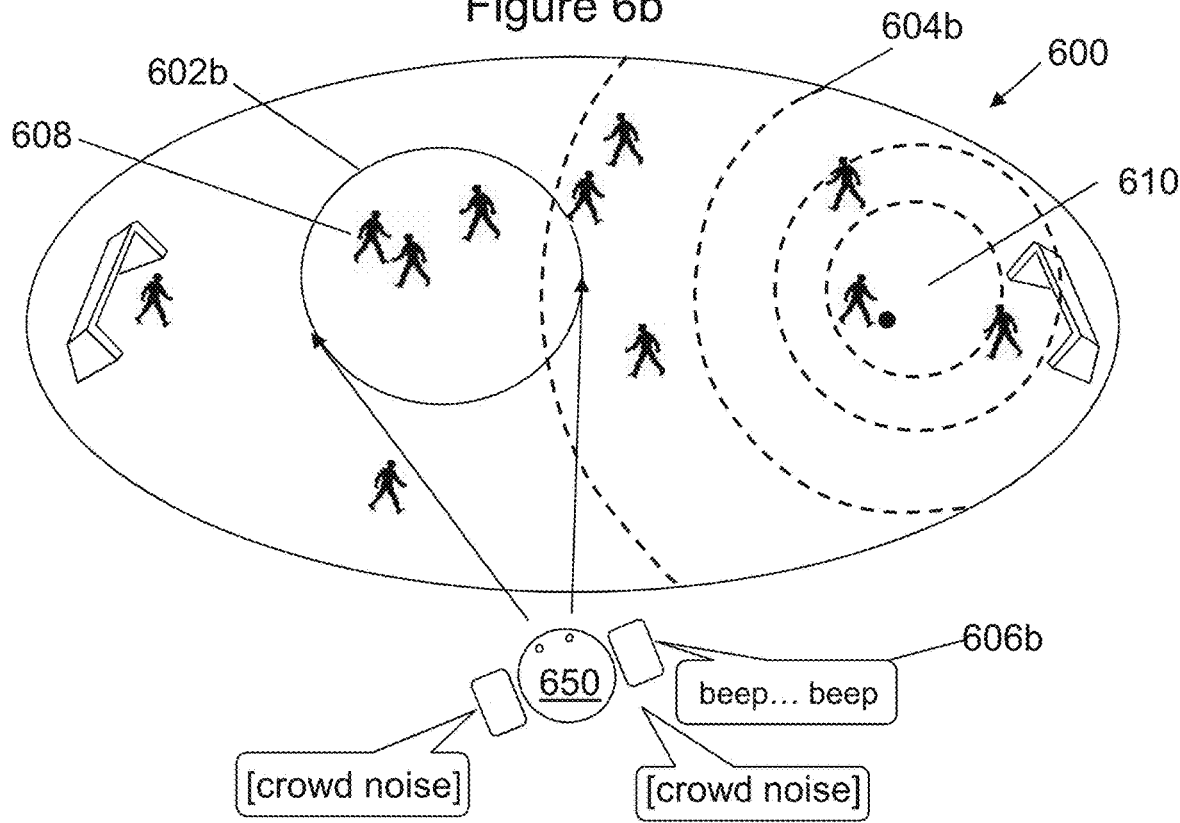

In FIG. 6b the viewer receives sensory cues 604b, 606b to indicate to him that an event of interest 610 will take place soon (a winning goal will be scored). The viewer's current field of view 602b is in a different direction to the direction he must look to see the goal 610, so the viewer 650 will not see the goal unless he changes his field of view 602b. To indicate to the viewer 650 that an event is about to occur, sensory cues (in this example a visual cue 604b and an audio cue 606b) are provided to indicate to the viewer 650 than an event 610 is about to occur.

In this example the visual cue 604b comprises a series of ripples superimposed onto the video content 600 such that the video content itself appears to be rippling (e.g. deformed). The centre of the ripples is the location of the event, taken from the future-event-direction data. The effect may be considered to appear within the video content itself as the video images appear deformed by the visual cue effect. In this example the spacing of the ripples indicates how far away in time the event is (that is, it represents how long the viewer 650 has until the event takes place with closer spaced ripples for events closer in time), and the amplitude of the ripples indicates how far away in space the event is from the viewer's current field of view 602b (with larger amplitude ripples for events with a greater spatial distance from the current field of view in this example, but the opposite could be provided in other examples).

In this example the audio cue 606b comprises a series of beeps superimposed onto the audio commentary for the video content 600. In this example the spacing in time of the beeps indicates how far away in time the event is (that is, it represents how long in time the viewer 650 must wait until the event takes place, with closer spaced beeps representing an event happening sooner and further spaced beeps indicating an event further away in time), and the amplitude/volume of the beeps indicates how far away in space the event is from the viewer's current field of view 602b, with louder beeps indicator an event further from the current field of view and quieter beeps indicating the location of the event is closer to the current field of view (or vice versa).

In FIG. 6b, the event is 10 seconds away so the visual ripples 604b are spaced apart by a first (large) distance representative of a 10 second time interval until an event occurring and the audio beeps 606b are relatively far apart, spaced apart by a first time separation representative of a 10 second time interval until an event occurring. Further, at the (relatively large) spatial distance between the current field of view 602b and the event location 610, the visual ripples 604b have a first (large) amplitude indicating the relatively large distance which the user has to change his field of view by in order to see the event, and the audio beeps 606b have a first (relatively quiet) volume to indicate the event is relatively far away in time.

The viewer has seen the visual cue 604b, heard the audio cue 606b, and wishes to see the event.

In FIG. 6c, the viewer changes his current field of view 602c to move towards the event. The time to wait until the event is now five seconds. Therefore, the visual ripples 604c are spaced apart by a second (smaller) distance representative of a five second time interval until an event occurring and the audio beeps 606c are relatively close together, spaced apart by a second smaller time separation (higher frequency) representative of a five second time interval until an event occurring. Further, at the smaller spatial distance between the current field of view 602c and the event location 610, the visual ripples 606b have a second (smaller) amplitude indicating the smaller distance which the user has to change his field of view by in order to see the event, and the audio beeps 606c have a second (relatively loud) volume to indicate the event is relatively close in time.

In other words, in this example the sensory (visual and audio) cues 604b, 606b, 604c, 606c are configured to vary according to the spatial distance and temporal distance from the occurrence of the event 610, in that as the viewer's field of view 602b moves closer to the event 610, the visual ripples 604b become smaller and audio cues 606b louder, and as the event 610 approaches in time, the visual ripples 604c become closer spaced and audio cues 606c more rapidly repeating.

In FIG. 6d, the viewer's current field of view 602d includes the location of the event 610. Because the viewer's field of view 602d includes the event 610, the visual cue and audio cue have disappeared, because the viewer does not need to be alerted to an event occurring since he will see the event with his current field of view.

The above example includes both audio and visual sensory cues to indicate both spatial and temporal distances to an event of interest taking place in the recorded panoramic video content. Of course the variations in audio and visual cues may be different in different examples. For example, audio cues may decrease in volume as an event approaches in time, to avoid drowning out any audio output from the recorded panoramic video content which is relevant to the event. As another example, visual cues may have a higher amplitude, become brighter, and/or change colour as the spatial separation between the event and the field of view decreases, to highlight that the viewer's current field of view is close to the event location. The nature of the audio and visual cues (e.g., the shapes, colours and visual effects of a visual cue, and the sounds of an audio cue) may be different in different examples and may be different dependent on a user's personal preference profile in some examples. In some examples, only audio sensory cues may be provided, or only visual sensory cues (for example, a user may specify they do not wish to receive audio sensory cues if they have difficulty hearing clearly).

Different types of visual effect used to provide a visual cue are discussed in more detail in relation to FIGS. 7a-7c. These figures illustrate visual patterns which may in some examples be superimposed on and formed within video content of recorded panoramic video output, to provide the effect of the video content itself being deformed/warped. The visual effect may be a ripple effect as in FIG. 7a (e.g. if the event is displayed lateral to and/or behind a viewer of the current field of view), a ray effect as in FIG. 7b or a ripple/light combination effect as in FIG. 7c. Of course many visual effects are possible. So, for example, a colourful deformable visual pattern may be blended with the playback video frames to represent an event which will take place in the video content.

In an example of a ripple waveform, as shown in FIG. 7a, the video content itself may appear to ripple with the centre of the ripple focussed on the location of the future event. As another example of a visual cue being superimposed with the video content to give an effect of the video content being altered, rings of increased contrast, of inverted colour, or of another change to the colour palette of the video output may be displayed.

In an example of a ray-type visual effect as shown in FIG. 7b, the ray may appear to emanate radially from, to spread out concentrically from, the location of the future event.

In the example of a colourful ripple effect as shown in FIG. 7c, different regions of colour may emanate from the future event location in the video content to indicate, for example, the context of the future event (e.g., a green visual effect may indicate a positive event, a blue visual effect may indicate an unusual event, and an orange visual effect may indicate an exciting event). Colour effects may be considered to be visual effects which are provided as an overlay wherein the video content is not deformed but a coloured visual effect is overlaid on top of the content. Another example of an overlay visual effect is of a series of outward concentric rings which are overlaid on and radiate out from the location of a future event. The rings may appear to be, for example, coloured rings, or rings of increased brightness, or contour-like lines overlaid on top of the non-deformed video content.

The strength of the visual effect may reflect the timing of the event, for example with a brighter visual effect and for other types of sensory cue, a louder audio effect or a stronger haptic effect being provided as the event approached the current time.

Distinguishable multiple visual patterns associated with multiple events of interest in the video may be used at the same time. Regarding visual cues, for example, a green visual effect may be used to indicate an event which will be shown in 30 seconds, an amber visual cue if the event is between 8 and 20 seconds away, and a red visual cue if the event is between 0 and 8 seconds away. The nature of the visual cue may indicate temporal distance from a future event (for example, the visual cue may flash or pulse in the final three seconds before the event occurrence). For a visual cue with a periodic variation, such as a ripple effect, the frequency of the variation may indicate the temporal distance from the event, with the ripples being more closely spaced together as the event approaches in time. Thus if there are multiple sets of ripples, the viewer may turn towards the most closely spaced ripples first.

In some examples the context of an event may be portrayed using a visual cue. For example, an event of interest to a particular user may have an associated brighter visual cue than an event of less interest to a particular user which may have an associated less bright visual cue.

In other examples distinguishable multiple audio sources associated with multiple events in the video output may be used at the same time. Multiple audio effects may be multiplexed with different density levels to represent multiple events of interest (for example, events which are located further spatially from the viewer's field of view may have a louder, or more rapidly repeating, associated audio cue, whereas events which are close to the viewer's current field of view may have a relatively quieter, or more slowly repeating, associated audio cue). A user interface, such as a volume up and down tuning button or slider, may be available for a viewer to adjust the sound levels for suit his personal preference.

If two events are due to occur close together in time (for example, less than five seconds apart), then each event in the panoramic video may have an associated visual cue to indicate which direction to look in to see the event, but an event which is more closely linked to the profile of the user may also have an associated audio cue to additionally alert the user that of the several events about to be displayed, one of those may be of particular interest to him. Such user preferences may be matched to events by, for example, matching a descriptive metadata tag of an event to a description of interests in a user profile.

In the examples of audio sensory cues, in some examples an audio cue/sound may be recorded and fused/superimposed into the original soundtrack of the recorded panoramic video output. The audio cue may be used to indicate a direction of an event in an immersive video playback system. The audio (and/or visual) blending of cues with the original video output may be performed online or offline. In examples combining two or more types of sensory cue which provide a "pattern" of sensations, such as a series of ripples of a visual cue, a series of periodic blips of an audio cue, or a series of vibrations of a haptic cue, the different types of cue may be synchronised. Thus a new ripple spreading outwards from an event location may be accompanied by a haptic vibration and the periodicity of the ripples and vibrations are the same.

In the examples, the user may be able to provide an input to dismiss/stop a provided sensory cue. The user may be able to, for example, indicate that he has acknowledged the sensory cue and be able to make a user input to stop the sensory cue from continuing to be displayed. An example may be that the user's eye gaze is tracked, and if it is determined that the user's eye gaze is directed to an event being indicated by a sensory cue, the sensory cue may stop being provided. In some examples the apparatus may be configured to detect that a user has acknowledged the sensory cue(s) and correspondingly stop providing the sensory cue(s) for that event. The sensory cue may be prevented from being displayed until the user changes his user settings to allow that sensory cue again, or may be prevented from being displayed for the current video playback, but would be provided again if the same video way played at another time.

FIG. 8 illustrates schematically the main step of a method 800 described herein, namely using received current-field-of-view indication data together with future-event-direction data, in respect of recorded panoramic video output provided by panoramic video content data, to provide a sensory cue for a viewer of the recorded panoramic video output to indicate the direction of a future event in the recorded panoramic video output which is outside a current field of view, wherein the recorded panoramic video output is configured to provide video content to the viewer which extends outside the field of view of the viewer in at least in one direction, and the future-event-direction data is supplemental to the panoramic video content data which provides the video content itself.

FIG. 9 illustrates schematically a data structure 900 comprising future-event-direction data 904 and panoramic video content data 902, the panoramic video content data 902 providing recorded panoramic video output. The future-event-direction data 904 together with received current-field-of-view indication data, in respect of the recorded panoramic video output, are configured to provide a sensory cue for a viewer of the recorded panoramic video output to indicate the direction of a future event in the recorded panoramic video output which is outside a current field of view of the viewer in at least one direction. The recorded panoramic video output is configured to provide video content to the viewer which extends outside the field of view of the viewer in at least in one direction. The future-event-direction data 904 is supplemental to the panoramic video content data 902 which provides the video content itself, as shown in FIG. 9. The future event data may, in some examples, be embedded within the panoramic video content data rather than by physically separate to it. In such cases, the future event data would still be supplemental to the data which provides the video content itself.

The panoramic video data 902 and future event direction data 904 are synchronised so that the appropriate sensory cues may be provided with the corresponding portions of the panoramic video content. If more than one type of sensory cue may be provided then these may also be synchronised together. In FIG. 9, a flag 906 may be present in the future-event-direction data to indicate that an event of interest 908 will occur in a predetermined number of frames' time (illustrated as three frames, but more, or less, may be used). In this way the flag initiates the availability of a sensory cue to be provided to a viewer, and each flag 906 is linked to a corresponding event of interest 908.

FIG. 10 illustrates a computer/processor readable medium 1000 providing a computer program according to one example. The computer program may comprise computer code configured to perform, control or enable a method described herein. In this example, the computer/processor readable medium 1000 is a disc such as a digital versatile disc (DVD) or a compact disc (CD). In other examples, the computer/processor readable medium 1000 may be any medium that has been programmed in such a way as to carry out an inventive function. The computer/processor readable medium 1000 may be a removable memory device such as a memory stick or memory card (SD, mini SD, micro SD or nano SD). In some examples, the computer program may be embodied over a distributed system (for example, the future-event-direction data may be stored at a remote server, the panoramic video content data may be remotely stored at the same (or a different) server, and the current-field-of-view data may be received by a portable apparatus, such as a head-mounted display unit or smart eyewear).

Any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry may have other functions in addition to the mentioned functions, and that these functions may be performed by the same apparatus/circuitry. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc.), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognised that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising at least one processor and at least one non-transitory memory including computer program code, the at least one non-transitory memory and computer program code configured to, with the at least one processor, enable the apparatus at least to:
cause recorded panoramic video output from panoramic video content data to be played, wherein the recorded panoramic video output includes at least one predetermined event;
use received current-field-of-view indication data together with future-event-direction data for the at least one predetermined event, in respect of the recorded panoramic video output, to provide a sensory cue for a viewer of the recorded panoramic video output, in conjunction with a current field of view of the viewer, to indicate a direction of the at least one predetermined event in the recorded panoramic video output which is outside the current field of view,
wherein the sensory cue is configured to disappear when the at least one predetermined event in the recorded panoramic video output is within the current field of view,
wherein the recorded panoramic video output is configured to provide video content to the viewer which extends outside the field of view of the viewer in at least one direction, and the future-event-direction data is supplemental to the panoramic video content data which provides the video content itself and indicates the at least one predetermined event that is available to be displayed to the viewer in the at least one direction.

2. The apparatus of claim 1, wherein the sensory cue comprises one or more of:
an audio cue;
a visual cue; and/or
a haptic cue.

3. The apparatus of claim 1, wherein the sensory cue comprises an indication of time remaining until the occurrence of the at least one predetermined event in the recorded panoramic video output.

4. The apparatus of claim 1, wherein the sensory cue is configured to vary according to one or both of the spatial and temporal distance from the occurrence of the event.

5. The apparatus of claim 1, wherein the sensory cue comprises a periodically varying cue and wherein the period of the periodically varying cue decreases as the time until the occurrence of the at least one predetermined event decreases.

6. The apparatus of claim 1, wherein the sensory cue comprises a visual cue superimposed on and formed with the video content itself with one or more of:
a ripple effect visual cue;
a ray visual cue, and/or
a waveform visual cue.

7. The apparatus of claim 1, wherein the sensory cue comprises a ripple effect visual cue, and wherein the apparatus is configured to provide the ripple effect visual cue within the current field of view when the direction of the at least one predetermined event is determined to be one or more of:
located substantially laterally to the current field of view, and/or
located substantially behind a viewer of the current field of view.

8. The apparatus of claim 1, wherein the current field of view is one or more of:
a default field of view, or
a determined current field of view of the viewer.

9. The apparatus of claim 1, wherein the apparatus is configured such that:
the video content within the current field of view and the video content outside the current field of view are displayed simultaneously; or
the video content within the current field of view is displayed and the video content outside the current field of view is not displayed simultaneously.

10. The apparatus of claim 1, wherein the apparatus is configured such that one or more of the following is performed:
video content outside the current field of view is brought into the current field of view, where bringing the video content into the current field of view comprises panning the current field of view over a display of the recorded panoramic video output; or
video content outside the current field of view is brought into the current field of view, where bringing the video content into the current field of view comprises scrolling the recorded panoramic video output with respect to the current field of view.

11. The apparatus of claim 1, wherein the future event is identified with one or more event metadata tags identifying one or more properties of the at least one predetermined event.

12. The method of claim 1, wherein the sensory cue comprises a visual cue superimposed on and formed with the video content itself with one or more of:
a ripple effect visual cue;
a ray visual cue, and/or
a waveform visual cue.

13. A method comprising:
causing recorded panoramic video output from panoramic video content data to be played, wherein the recorded panoramic video output includes at least one predetermined event;
using received current-field-of-view indication data together with future-event-direction data for the at least one predetermined event, in respect of the recorded panoramic video output, to provide a sensory cue for a viewer of the recorded panoramic video output, in conjunction with a current field of view of the viewer, to indicate the direction of the at least one predetermined event in the recorded panoramic video output which is outside the current field of view,
wherein the sensory cue is configured to disappear when the at least one predetermined event in the recorded panoramic video output is within the current field of view,
wherein the recorded panoramic video output is configured to provide video content to the viewer which extends outside the field of view of the viewer in at least one direction, and the future-event-direction data is supplemental to the panoramic video content data which provides the video content itself and indicates the at least one predetermined event that is to be displayed to the viewer in the at least one direction.

14. The method of claim 13, wherein the sensory cue comprises one or more of:
an audio cue;
a visual cue; and/or
a haptic cue.

15. The method of claim 13, wherein the sensory cue comprises an indication of time remaining until the occurrence of the predetermined event in the recorded panoramic video output.

16. The method of claim 13, wherein the sensory cue is configured to vary according to one or both of the spatial and temporal distance from the occurrence of the predetermined event.

17. The method of claim 13, wherein the sensory cue comprises a periodically varying cue and wherein the period of the periodically varying cue decreases as the time until the occurrence of the predetermined event decreases.

18. A non-transitory computer readable medium encoded with instructions that, when executed with a computer, perform:
 cause recorded panoramic video output from panoramic video content data to be played, wherein the recorded panoramic video output includes at least one predetermined event;
 use received current-field-of-view indication data together with future-event-direction data for the at least one predetermined event, in respect of the recorded panoramic video output, to provide a sensory cue for a viewer of the recorded panoramic video output, in conjunction with a current field of view of the viewer, to indicate a direction of the at least one predetermined event in the recorded panoramic video output which is outside the current field of view,
 wherein the sensory cue is configured to disappear when the at least one predetermined event in the recorded panoramic video output is within the current field of view,
 wherein the recorded panoramic video output is configured to provide video content to the viewer which extends outside the field of view of the viewer in at least one direction, and the future-event-direction data is supplemental to the panoramic video content data which provides the video content itself and indicates the at least one predetermined event that is to be displayed to the viewer in the at least one direction.

19. The non-transitory computer readable medium of claim 18, wherein the sensory cue is configured to vary according to one or both of the spatial and temporal distance from the occurrence of the predetermined event.

20. The non-transitory computer readable medium of claim 18, wherein the sensory cue comprises a periodically varying cue and wherein the period of the periodically varying cue decreases as the time until the occurrence of the predetermined event decreases.

\* \* \* \* \*